United States Patent
Naumann et al.

(10) Patent No.: US 7,168,548 B2
(45) Date of Patent: Jan. 30, 2007

(54) FLEXIBLE PRODUCTION LINE COMPRISING A PLURALITY OF DECOUPLING MODULES FOR MACHINING WORKPIECES ARRANGED ON PALLETS.

(75) Inventors: Hans Naumann, Albany, NY (US); Jürgen Heckendorf, Felsberg (DE); Holger Seyb, Göttingen (DE); Rainer Haberkorn, Chemnitz (DE)

(73) Assignee: Niles Simmons Industrieanlagen GmbH, Cheumitz (DE)

( * ) Notice: Subject to any disclaimer, the term of this patent is extended or adjusted under 35 U.S.C. 154(b) by 0 days.

(21) Appl. No.: 11/129,671

(22) Filed: May 13, 2005

(65) Prior Publication Data

US 2005/0241129 A1   Nov. 3, 2005

Related U.S. Application Data

(63) Continuation of application No. PCT/EP03/12741, filed on Nov. 14, 2003.

(30) Foreign Application Priority Data

Nov. 15, 2002   (DE) ............................... 102 53 224

(51) Int. Cl.
B65G 43/08   (2006.01)
(52) U.S. Cl. ................... 198/346.2; 198/346.1
(58) Field of Classification Search ........... 198/341.03, 198/341.02, 345.1, 346.1, 346.2
See application file for complete search history.

(56) References Cited

U.S. PATENT DOCUMENTS

| | | | | |
|---|---|---|---|---|
| 3,889,797 A | * | 6/1975 | Naito et al. ............... | 198/346.1 |
| 4,722,653 A | * | 2/1988 | Williams et al. ......... | 198/346.2 |
| 4,747,193 A | * | 5/1988 | Hashidate et al. ....... | 198/346.1 |
| 4,890,969 A | * | 1/1990 | Esser ....................... | 198/346.2 |
| 5,273,392 A | * | 12/1993 | Bernard et al. .......... | 198/346.2 |
| 5,353,495 A | * | 10/1994 | Terabayashi et al. .... | 198/346.2 |
| 6,854,583 B1 | * | 2/2005 | Horn ......................... | 198/348 |
| 2002/0148704 A1 | | 10/2002 | Jager | |

FOREIGN PATENT DOCUMENTS

| | | |
|---|---|---|
| DE | 198 49 374 | 4/2000 |
| DE | 199 48 139 | 4/2001 |
| DE | 101 12 169 | 10/2002 |
| EP | 1 125 684 | 8/2001 |
| GB | 2 301 338 | 12/1996 |

OTHER PUBLICATIONS

International Preliminary Examination Report dated May 13, 2005.

* cited by examiner

*Primary Examiner*—James Bidwell
(74) *Attorney, Agent, or Firm*—Katten Muchin Rosenman LLP

(57) ABSTRACT

The invention relates to a flexible production line for machining undulated workpieces arranged individually or in groups on a pallet, in a plurality of successive operations (OP-20, OP-40) carried out along from pallet stores. In order to machine series' of workpieces, the entire production line is divided into a plurality of decoupling modules. A plurality of operations (OP-20, OP-40) are associated with each decoupling module. A stacker for individual pallets is associated with each decoupling module. Each decoupling module has at least one store for pallets and the decoupling modules are interconnected by transfer conveyors.

13 Claims, 4 Drawing Sheets

Figure 1:
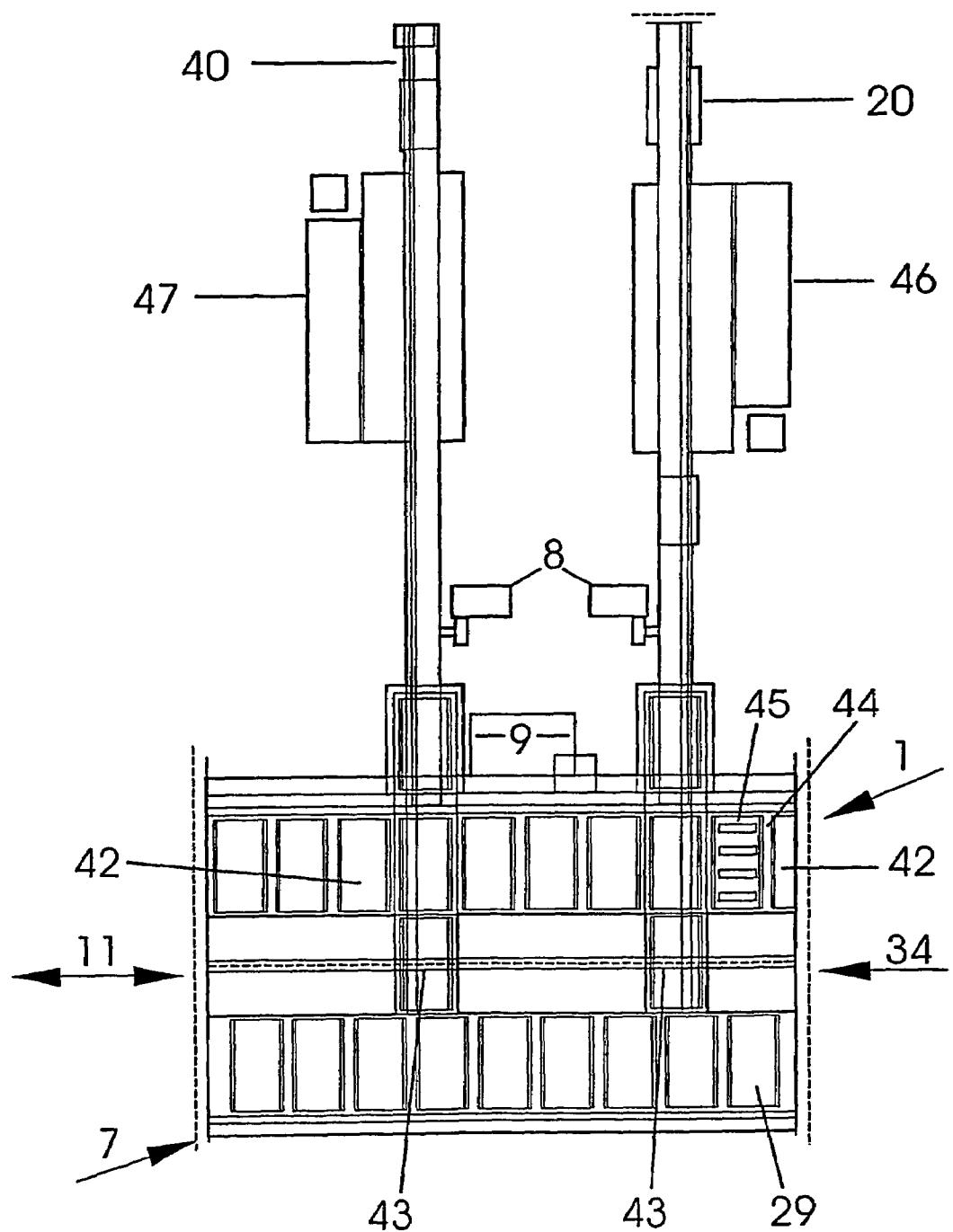

FLEXIBLE PRODUCTION LINE COMPRISING A PLURALITY OF DECOUPLING MODULES FOR MACHINING WORKPIECES ARRANGED ON PALLETS.

CROSS-REFERENCE TO RELATED APPLICATION

This application is a continuation of International Application PCT/EP2003/012741 filed on Nov. 14, 2003, now PCT Publication Number WO2004/045804, the contents of which are herein wholly incorporated by reference.

The invention relates to a production line for machining of shaft-like workpieces in machining operations.

A comparable production system is known, for example, from German Patent 19948139 A1. The known production system is designed to be adaptable as simply as possible to demand by increasing or decreasing the production capacity and to permit the most flexible possible installation of individual machine tools. For this purpose, different types of machine tools are provided as multiple redundant units, and a workpiece accumulator is disposed upstream from each machine tool. The controller of an associated transport system determines the fullness level of the individual workpiece accumulators and diverts the workpieces to be machined from the workpiece accumulator to a particular machine tool as a function of the fullness level. Accordingly, a workpiece accumulator that simultaneously serves as a workpiece buffer is disposed upstream from each machine tool. The emphasis of the known production system lies in adaptability to the respective quantitative demand. Since the machines are provided as multiple redundant units, production output can be influenced by the capacity of the individual machines on the one hand and by the number of machines of the same type on the other. Thus it is possible that, during production of large series of an industrial mass-produced product, such as a motor vehicle, there will be used a production system for production of a special component that requires three or four machine models of the same type. In the event of slackening demand, the known production system can be adapted quickly and simply, by turning off one or more machines of the respective individual machine model.

A production system is known from German Patent 19849374A1. The production system has increased productivity for the production of workpieces by preventing a backup upstream from a failed machine. For this purpose the production line is composed of roller conveyors, from each of which transfer tables branch off to individual machining machines. In each case, two roller conveyors run parallel to one another and parallel to the main production line. Shift tables are provided between the main production line and the roller conveyors. A section of the main production line, of the roller conveyors with a shift table, a transfer table and a machining machine are combined respectively as a module. The individual modules overlap into one another. The known production system is designed such that a backup of workpieces is avoided. The workpieces being backed up are conveyed in a waiting loop, which can extend at least over the length of one module and if necessary even of several modules.

An interlinked production system is known from European Patent 1125684 A2. To improve known production systems, increased productivity is supposed to be achieved by the most flexible possible control of parts throughput even by a large system with many machining devices, both in the case of one-piece flow and in the case of throughput using buffers. For this purpose there are provided at least three buffers, which are constructed to receive parts carriers and respectively have at least two stacking stations. Between the stacking stations there is provided a shuffling device, so that parts carriers can be shuffled inside the buffer between the parts carriers. The buffers are configured in the form of automation cells, which can be loaded from outside a production line. Inside the automation cells, workpiece carriers can be stacked, repositioned and turned around without the need for outside intervention. Restacking and manipulation operations inside the working chamber of the automation cells are decoupled from the inward and outward transfer of workpiece carriers in a loading chamber. Thus the necessary safety against accidents can be ensured. The known production system combines the advantages of line production with the advantages of automation cells, thus permitting flexible buffer size and flexible feed of workpiece carrier stacks.

Finally, from German Patent 10112169 A1, there is also known an interlinked production system for performing machining operations on parts. The production system is supposed to permit rapid transport of parts to the respective machining operations and to ensure the highest possible availability and safety against failure during short throughput times by the overall system. The production system has at least one first and at least one second machining operation. A first portal, which extends in the direction of the production line, couples the two machining operations with one another. A second portal extends transverse to the direction of the production line and couples a plurality of first or second machining stations with one another, an accumulator tray for receiving parts being associated with every second portal. In this case the emphasis is on associating an accumulator with every second portal, whereby numerous individual accumulators, whose coordination makes the known production system correspondingly sluggish, are required for the system. According to an advantageous improvement, there is provided a plurality of first and second portals, which respectively intersect one another at crossover points, each crossover point being assigned its own accumulator tray. In this way additional redundancy is introduced into the production system, since there is achieved an overall system, which is interlinked both in the direction of the main parts flow and also in the direction transverse thereto and which is constructed as a network-type structure, which in turn has accumulator trays at the network node points and thus supposedly achieves extremely high flexibility. At the same time, however, coordination of network node points in the direction of a main production line is extremely complicated and difficult, and therefore doubts are cast on the alleged flexibility.

In contrast, the object of the present invention is to simplify the production line and to organize it more clearly, as well as to be able to change over the production of series of workpieces that are similar but different from one another in detail, for example shaft-like workpieces, such as crankshafts, camshafts, actuating shafts or gear shafts, from series to series, without problems. In this connection, it is also intended that continuous throughput of the workpieces through the production line be guaranteed, without meaning that shutdown of the entire production line is a prerequisite for the changeover of individual machines or the changing of individual operations. Finally, it is intended that high flexibility be achieved and that the needed production floor space be reduced.

According to the invention, the object is achieved by the fact that the entire production line has at least one decoupling module, via which the production line can be operated, the decoupling module is designed as an accumulator cell, which takes over workpiece storage and workpiece transport, the decoupling module is composed of pallet accumulator with pallet cycling device—rack servicing unit—including at least one slide-in and slide-out station, one or more machining operations are supplied with workpieces via the slide-in and slide-out station, the machining station is usually constructed as a production cell, composed of machining station with portal loading, SPC drawout unit (Statistical Process Control), intermediate trays, orienting stations, measuring stations, safety devices, each decoupling module is provided to feed individual addressable pallets with a plurality of workpieces deposited thereon to one of a plurality of similar or different machining operations, individual decoupling modules are combined with one another in and also counter to the direction of the production line, at the beginning of the production line, the decoupling module is connected to an infeed device for pallets containing workpieces to be machined and at the end of the production line, the decoupling module is connected to a removal device for pallets containing machined workpieces.

According to the invention, therefore, an entire production line is subdivided into individual subsections. These subsections, which at the same time are provided for manipulation, conveying of workpiece carriers, namely pallets and accumulation thereof, are known as decoupling modules. Several operations, meaning machining machines, measuring stations or washing stations, etc., are assigned to each decoupling module. The size, especially the length of the individual decoupling modules as well as the number of operations assigned respectively to them is determined by the minimum cycle-time and workpiece requirements. In this connection the size and configuration of the accumulator is important. The size thereof is determined in such a way that, during changeover from one operation, the next operation can be supplied without interruption, for a time corresponding to the changeover time, with workpieces that have been machined previously in the operation being changed at that exact moment. The accumulator zones of the decoupling modules can be freely assigned to the operations. The decoupling module is also a malfunction accumulator.

In the event of malfunctions or interruptions of production, therefore, it is not necessary to allow the entire production line to run empty because of changeover. Instead, the system is capable of reacting flexibly to such events, so that the throughput times achieved for individual series can be conveniently kept in conformity with estimates.

Operations are changed over successively, without the need to turn off the upstream and downstream process.

The already changed over operation with a new workpiece operates into the accumulator, and the operation that has not yet been changed over operates out of the accumulator.

Not all operations or decoupling modules are simultaneously involved in the changeover of a production line. Individual operations or decoupling modules can be disconnected or connected, while other operations or decoupling modules are taken over without change. Since a changeover action usually always begins with the furthest upstream operation to be changed over, however, it is provided that, in the sequence of operations, adequate accumulator capacity is always present in a decoupling module downstream from the first operation to be changed over. Each decoupling module contains a pallet accumulator with an adequate number of bays for the pallets. The number s of bays is given by:

$$s = \sum_{n=1}^{N} \frac{t_n}{t_z \cdot M} + \text{malfunction accumulator} + \text{working accumulator}$$

$t_n$=changeover time of operation n
$t_z$=cycle time
M=number of workpieces per pallet
N=number of portals (gates) per decoupling module The bays all have the same size and can be operated by an individual rack servicing unit. A controller in the form of an on-board computer guides the rack servicing unit to each pallet, whose address is specified in the production program. The deposition of pallets inside the pallet accumulator is arbitrary; in other words, during deposition of a pallet, that bay which has just become free and which is closest to the rack servicing unit is activated. The paths traveled by the rack servicing unit along the pallet accumulator are stored in the controller and are available once again when a pallet is called. The distances that the rack servicing unit travels are optimized by its controller, and it is behind this that the particularly high flexibility of the system is concealed. In this way, the controller in each case functions as long as only one individual rack control unit is in service on the decoupling module.

Regularly and, in fact, for reasons of structural simplification and uniformity, all pallet accumulators of a production line have the same structure. Depending on the decoupling module to which the pallet accumulator belongs, it can occasionally have more bays than are needed for the machining operations. This overcapacity of accumulator stations is not an interference, however, since the "intelligent" rack servicing unit will always operate only as many bays as the machining operations need. Superfluous accumulator capacity can be made available if necessary to one of the upstream or downstream decoupling modules. By such shifting of accumulator capacities, the pallet accumulators can be kept correspondingly small, which in turn increases system flexibility.

For a given line cycle time, the number of pallets stored in a pallet accumulator is determined by the time provided for changeover of individual operations to another series. In this connection, line cycle time is understood as the completion, per unit time, of individual workpieces or of a plurality of similar workpieces grouped together on a pallet.

To reduce the shop floor space needed, it is expedient to combine two individual decoupling modules with different operations as a multiple decoupling module, which can then be operated by a single rack servicing unit for the pallets. This feature can be applied, for example, to combining the first and last decoupling modules of a production line. Completely different operations are assigned to each of these individual decoupling modules combined as a multiple decoupling module. Such a combination of decoupling modules has the advantage that, in this way, the shop floor space can be reduced and two decoupling modules can be operated simultaneously by means of one individual rack servicing unit. This type of arrangement of decoupling modules is similar to a mirror image.

To safeguard conveying as well as to ensure any necessary maintenance, two rack servicing units, one of which is redundant, are provided for each decoupling module. The two rack servicing units are preferably disposed at the beginning and/or at the end of each decoupling module. In the event of failure of an individual rack servicing unit, the other rack servicing unit can alone undertake the necessary pallet movements inside the decoupling module.

On the long side facing away from the rack servicing unit, the pallet accumulator has, for each bay, an additional pallet tray where the pallets can be kept in a ready position. From this ready position, the pallets are removed by transfer carriages, which can move forward and back transverse to the rack servicing unit. The transfer carriages take individual pallets from the ready position and guide them to the respective machining operations. Grippers on the machining operations take the workpieces to be machined individually from the pallet, guide them to the machining machine and afterward deposit the machined workpiece once again on the pallet. From there they are retracted into the bay of the pallet accumulator and brought by the rack servicing unit into a free bay of the pallet accumulator, in order to be stored there.

As already mentioned, individual operations are composed of different machine tool models, which perform different machining tasks on the workpieces. The machining capacity of the individual machine tool models can be adapted without difficulty to the demand by connecting a plurality of similar machine tools in series. Besides similar machine tools, however, machine tools that are complementary to and/or different from one another can be assigned to a decoupling module in the production sequence. The advantage of such an assignment is that work sequences within the production line can be changed without problem and different shaft-like workpieces can be machined simultaneously.

Workpieces can be cycled forward and backward relative to the process sequence.

The pallet accumulator inside an individual decoupling module has rack-like structure with a plurality of bays, which are disposed side-by-side and one above the other in the manner of stories and simultaneously constitute the accumulators. The dimensions of decoupling modules are determined substantially by the traveling times of the rack servicing unit, and usually amount to between twenty and fifty meters in length. In this way it is ensured that a human operator does not have to travel long distances beforehand in order to make occasional manual adjustments to the individual operations.

The elements provided for combining individual decoupling modules are composed of individual belt or roller conveyors. These are regularly disposed at such a height that human operators can walk effortlessly underneath them. At the same time, the upper of the two horizontal guides along which the rack servicing unit is guided is also extended at an adequate height above the pallet accumulator. Thus, if necessary in order to perform maintenance tasks, for example, the rack servicing unit can be removed from and reintroduced into the decoupling module.

In the following, the particular advantages of the inventive production line are again listed by key word:

In the production of shaft-like workpieces, the changeover of the entire production line from one type to another is determined one time by the longest changeover time that occurs.

Shaft-like workpieces, specially passenger-car crankshafts of different structural forms for R3 to R6 engines, V engines or W engines, and in different finishes, cast iron or steel, can be machined on the same production line.

Each crankshaft is continuously identifiable in the master computer as regards production status and quality status.

The sequence of machining operations can be modified as needed and is not permanently interlinked or tied to a given sequence.

The pallet accumulator inside a decoupling module is not assigned directly to an individual operation. The arrangement and number of accumulator stations provided inside a pallet accumulator is variable. Consequently a substantially larger accumulator can be assigned if necessary to a working sequence, for example if a shaft has different cycle-time requirements.

The cycle-time reserve of each working sequence is exploited to build a reserve stock of parts.

Reserve stock is exploited to bridge over outages due to changeover time per operation.

The decoupling module is combined via the transfer carriages with a programmable machine-loading device (portal robot)—production-cell gate.

The changeover duration per working sequence leads only to a single changeover loss.

The transport and storage systems are identical and therefore economical, and the complete production line forms a continuous system, which is constructed from structurally similar decoupling modules.

The invention will be described in more detail hereinafter with reference to a practical example.

Figure 2:
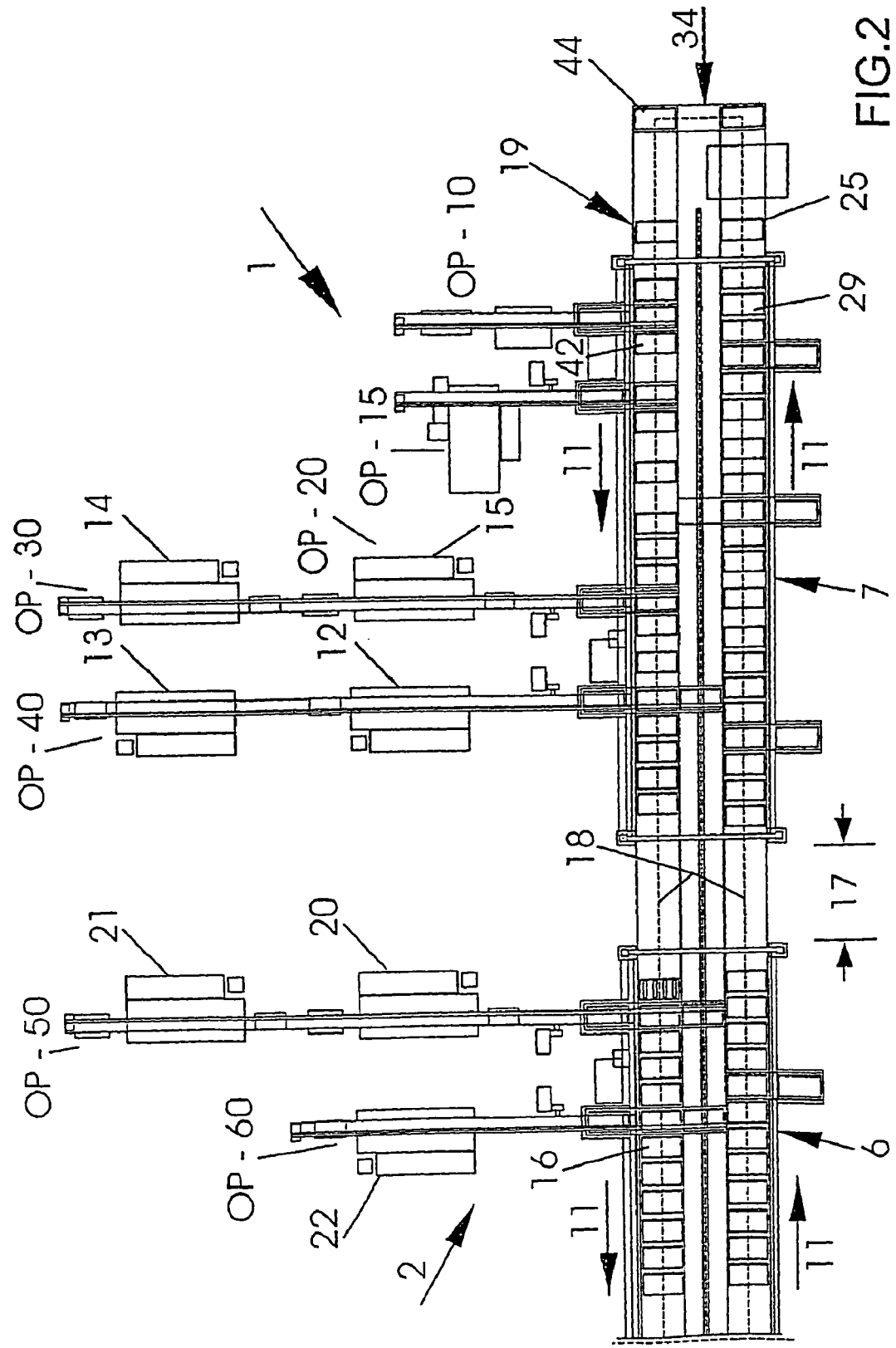
Figure 3:
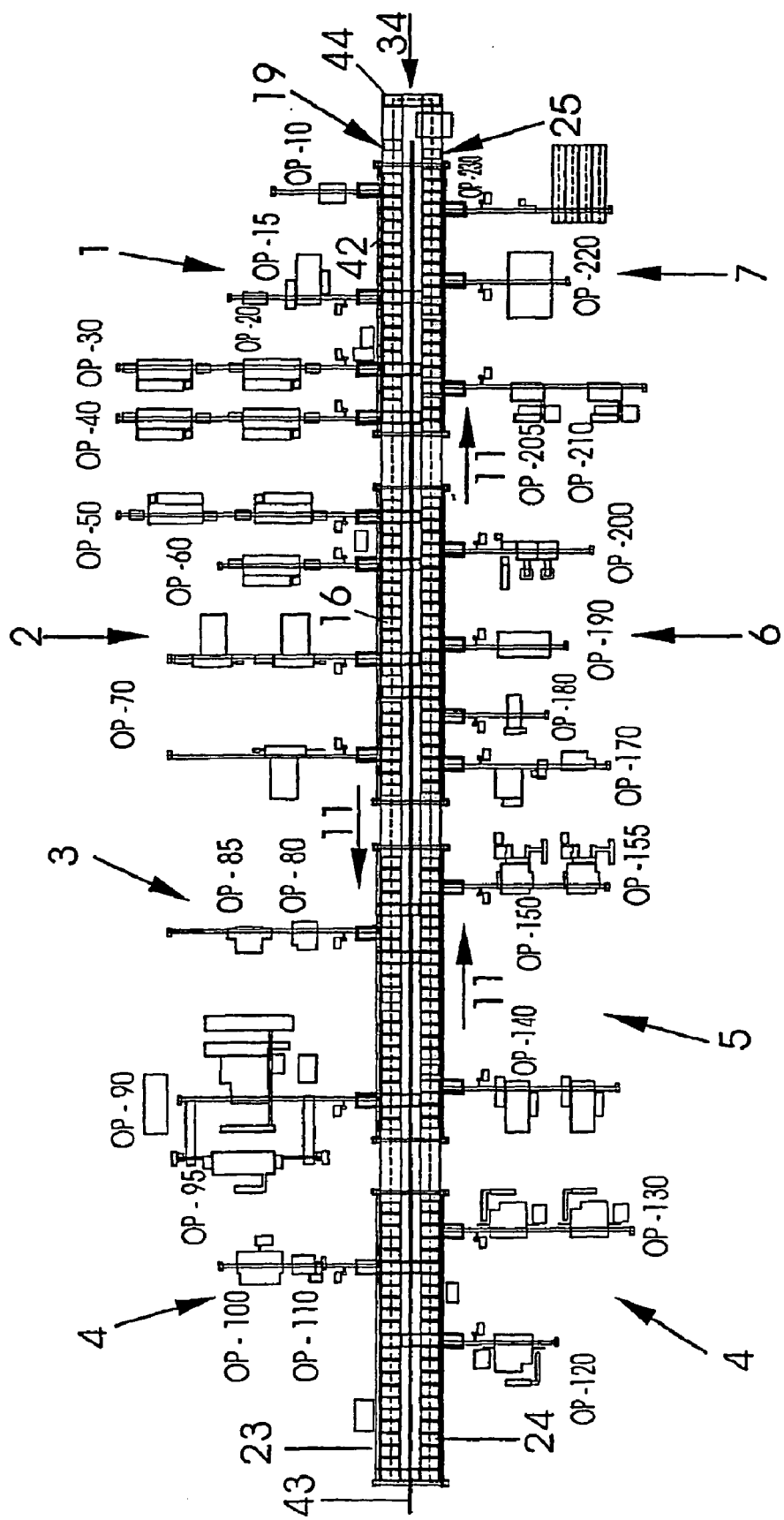
Figure 4:
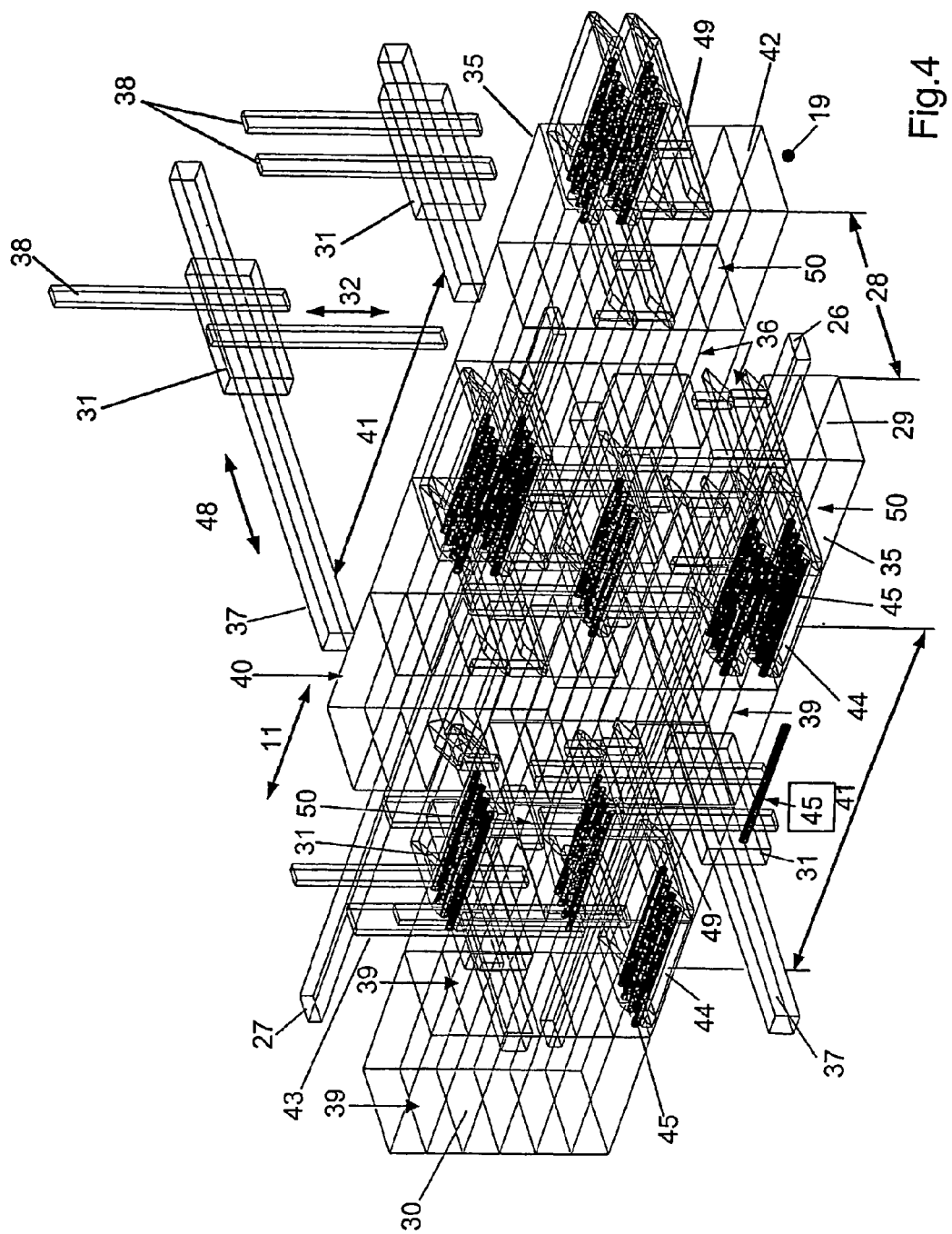

This practical example is illustrated in a schematic drawing on a reduced scale, wherein FIG. 1 shows the flow of a working sequence in a section of a decoupling module, FIG. 2 shows two decoupling modules adjoining one another, FIG. 3 shows a general view of the totality of a flexible production line and FIG. 4 shows a perspective view of a pallet accumulator.

FIG. 1 shows a longitudinal section of a decoupling module 1 of a production line 34. Decoupling module 1 is composed of a pallet accumulator 42, which extends in direction 11 of production line 34 and to which two rack servicing units 43 are assigned. Rack servicing units 43 are manipulators, which are provided for raising, lowering, conveying and depositing individual pallets 44 and packing them up again inside pallet accumulator 42. As an example, several crankshafts 45 are deposited side-by-side on such a pallet 44. By means of rack servicing units 43, pallets 44 are made ready for machining operations 46 and 47 and, after machining, are deposited once again in pallet accumulator 42. Operations 46 and 47 can be machine tools, which are disposed transversely, for example at right angles, to direction 11 of pallet accumulator 42. Between operations 46 and 47 and pallet accumulator 42 there is also provided a device 8 for statistical process-data acquisition. In addition, there can also be provided a measuring station 9, at which the measurements of individual crankshafts 45 are determined manually or automatically.

In an expanded detail of FIG. 1, FIG. 2 shows the current sequence:

| | |
|---|---|
| OP10 | identifying the parts |
| OP15 | measuring the imbalance of unmachined parts (optional) |
| OP20 | cutting to length, centering geometrically or mass-centering according to data from OP15 (optional) |
| OP30 | turning of flange, journal, main bearing 1, steady seat, |
| OP40 | rough-milling of main and rod bearings |

-continued

| | |
|---|---|
| OP50 | turn-broaching of main bearings, timing ring |
| OP60 | finish-milling of rod bearing |

In turn, after pallet accumulator 42 has been loaded with pallets 44, crankshafts 45 deposited thereon are first fed to operation OP-10. There part identification takes place. In the further travel 11 of pallet accumulator 42, operation OP-15, which is provided for mass-centering of crankshafts 45, is performed. This is followed by operations OP-20 and OP-30, wherein cutting to length, centering and milling of the radial stop face takes place in operation OP-20 and turning of the first main bearing, of the cheek, of the flange and of the journal of a crankshaft 45 take place in operation OP-30. As travel 11 continues, operation OP-40, which is provided predominantly for milling of the main bearing and cheeks, is performed. As is evident in FIG. 2, operation OP-40 includes, for example, two milling machines 12 and 13, with which the scheduled sections of a crankshaft 45 are milled. The preceding operation OP-30 is provided with two turning machines 14 and 15. Downstream from operation OP-40, first pallet accumulator 42 ends, as does first decoupling module 1 of production line 34 therewith. First pallet accumulator 42 is continued in pallet accumulator 16, which is adjoined in the same direction 11 following a separating gap 17 relative to pallet accumulator 42. Across separating gap 17, the two pallet accumulators 42 and 16 are connected to one another by transfer conveyors 18.

Accordingly, first decoupling module 1 extends from infeed 19 for pallet 44 to transfer belt 18 and comprises, in addition to pallet accumulator 42, operations OP-10, OP-15, OP-20, OP-30 and OP-40.

The pallet accumulator continuing as pallet accumulator 16 of the following decoupling module 2 begins with operation OP-50, which is occupied by milling machines 20 and 21, which are used for rough-milling and finish-milling of rod bearings of crankshafts 45. This is followed by operation OP-60, where the main bearings of crankshaft 45 are machined by means of a turn/turn-broaching machine 22.

FIG. 3 offers an overall view of a flexible production line 34 for crankshafts 45. Production line 34 is composed of individual decoupling modules 1, 2, 3, 4, 5, 6 and 7, disposed one after the other in production direction 11. By analogy with the example of FIGS. 1 and 2, there are assigned, to the individual decoupling modules 3, 4, 5, 6 and 7, further operations, examples of which are specially listed individually hereinafter for completeness:

| | |
|---|---|
| OP70 | boring of oil ducts |
| OP80 | deburring |
| OP85 | washing |
| OP90 | hardening |
| OP95 | tempering |
| OP100 | deep-rolling and roll-straightening |
| OP110 | finish-machining and rolling of fitting bearings |
| OP120 | grinding of main bearings |
| OP130 | grinding of rod bearings |
| OP140 | machining of flange, journals and key faces boring and thread-cutting of timing wheel |
| OP150 | grinding of flange |
| OP155 | grinding of journals |
| OP160 | washing |
| OP170 | performing crack inspection |
| OP180 | finish-machining of needle bearings |

-continued

| | |
|---|---|
| OP190 | mounting of timing ring |
| OP200 | finish-balancing |
| OP205 | post-balancing |
| OP210 | superfinishing |
| OP220 | finish-washing and drying |
| OP230 | performing final measurements, recording and classifying |

The overall picture of production line 34 for machining of crankshafts 45, camshafts or gear shafts is characterized by machine tools 12 to 15 and 20 to 22, which are assigned to individual operations OP-10 to OP-230. The following machine tools are to be found predominantly here: turning machines, broaching machines, turn-broaching machines, turn/turn-broaching machines, external and internal milling machines, milling machines, occasionally slot-milling machines, crankshaft deep-rolling and roll-straightening machines and grinding machines. Similar machines tools 12 to 15 and 20 to 22 are assigned to individual operations OP-10 to OP-230 of decoupling modules 1 to 7 either as single or serial multiple units. A plurality of machine tools is regularly present if necessitated by the cycle time of the individual operations OP-10 to OP-230. From operation to operation, OP-10 to OP-230, machine tools 12 to 15 and 20 to 22 are continuously interlinked with one another in production direction 11, as can be recognized in FIG. 3.

Not all operations OP-10 to OP-230 always have to be in service simultaneously, and so nor do machine tools 12 to 15 and 20 to 22 assigned to these operations. Depending on the series of similar workpieces to be machined, such as crankshafts 45 for 3-, 4-, 5-, 6- and multi-cylinder in-line engines or crankshafts 45 for V engines, individual operations OP-10 to OP-230 of a production line 34 can be turned off or on temporarily, as can therefore machine tools 12 to 15 and 20 to 22 assigned respectively to these operations OP-10 to OP-230.

For example, in a first of decoupling modules 1, 2, 3, 4, 5 and 6 there are disposed turning machines, external milling machines, turn/turn-broaching machines as well as tooth-cutting or slot-milling machines, to which machines there are assigned, in a second, subsequent decoupling module 2, 3, 4, 5, 6 and 7, machine tools for deep-rolling and straightening, hardening, grinding and finishing of crankshafts 45. As a logical consequence of this concept, an entire production line 34 can be reduced if necessary to an individual decoupling module 1, 2, 3, 4, 5, 6 or 7.

Preferably the machine tools are configured in horizontal construction to receive shaft-like workpieces of different type as well as clamping means and bits.

It is noteworthy in FIG. 3 that decoupling module 4 has approximately half the length extent of the other decoupling modules 1, 2, 3, 5, 6 and 7. Decoupling module 4 has been split, for example in the middle of its pallet accumulator 23, and continued almost in the form of a mirror image in pallet accumulator 24, which is disposed parallel to pallet accumulator 23 in the plane of FIG. 3 underneath rack servicing unit 43. In the same sense, decoupling modules 3 and 5, 2 and 6 as well as 1 and 7 with their respective pallet accumulators 42, 16, 23 and 24 are disposed parallel to one another and opposite a common rack servicing unit 43. Consequently, on the right side of FIG. 3, opposite input 19 of production line 34, there is disposed directly opposite output 25, where the finish-machined crankshafts 45 re-emerge from production line 34.

As can be seen more clearly in FIG. 4, a rack servicing unit 43 (not shown in more detail) is guided on two guide rails 26 and 27, which are parallel to one another and disposed with a separating gap one above the other, and along two pallet accumulators 42 and 29, which are disposed parallel side-by-side and with a separating gap 28 relative to one another. The two pallet accumulators 42 and 29 each have rack-like structure with a plurality of bays 30 of identical dimensions, disposed vertically one above the other in the manner of stories and horizontally side-by-side in rows 39, 40. Furthermore, in FIG. 4 there are evident pallets 44, on which crankshafts 45 are deposited. Rack servicing units 43 pick up individual pallets 44 at the beginning 19 of pallet accumulator 42 and deposit them in individual bays 30 of pallet accumulator 42 or 29. Furthermore, they also bring pallets 44 to one of the transfer conveyors 18 (FIG. 2) between decoupling modules 1 and 2, 2 and 3, etc. and 6 and 7, before depositing them again at output 25 of production line 34.

On the outer long sides 35 of pallet accumulators 42 and 29, which are each disposed opposite the inner long sides 36, there are provided devices 49, by means of which pallets 44 can be brought from each of the individual bays 30 into ready position. From the ready position, pallets 44 can be received by transfer carriages 31, which can be moved in direction 48 on horizontal guides 37 and vertical guides 38 and in this way can reach all bays 30 of a particular vertical row 50 of pallet accumulator 42 or 29. Transfer carriages 31 guide picked-up pallets 44 over their horizontal guides 37 to the target machining operations OP 10 to OP 230 and from there also return them to pallet accumulator 42 or 29. As can be seen in FIG. 4, the lateral spacing 41 of two vertical rows 50 relative to one another corresponds to the mutual spacing of horizontal guides 37 and thus also to the mutual spacing of operations in long direction 11. Transfer carriages 31 are devices known in themselves for horizontal and vertical conveying of objects. According to the invention, rack servicing units 43 convey pallets 44 horizontally in production direction 11 and also vertically in direction 32, and can deposit them in bays 30 as well as remove them from the bays once again. The on-board computer (not illustrated) of rack servicing unit 43 memorizes that bay 30 in which rack servicing unit 43 has deposited a pallet 44 and also the respective electronic address of the deposited pallet. When pallet 44 is called, rack servicing unit 43, by means of its electronic memory, retrieves it from that bay 30 in which it had previously deposited pallet 44. The deposition of pallets 44 in the individual bays 30 of a pallet accumulator 42 or 29 is completely random, with the exception of the servicing of bays 30 of rows 50. Bays 30 of rows 50 are reserved exclusively for the transfer of pallets 44 to transfer carriages 31 and thus to machining operations OP-10 to OP-230.

Within the meaning of the invention, bays 30 of rows 39 and 40 form the actual storage locations of pallet accumulators 42 and 29. The number of bays 30 of the individual pallet accumulators 42 and 29 is to be selected such that pallets 44 containing crankshafts 45 can be kept temporarily or in other words stored therein in sufficient number until a changeover to be performed on one of operations OP-10 to OP-230 within production line 34 has been completed, without the need to interrupt continuous production in direction 11. During changeover of one of operations OP-10 to OP-220, the contents of bays 30 are emptied and delivered to an operation OP-15 to OP-230 that follows it in transport direction 11.

LIST OF REFERENCE NUMERALS 1 to 7 decoupling modules
42 pallet accumulator
43 rack servicing unit
44 pallets
45 crankshaft
46 operation
47 operation
8 statistical process-data acquisition
9 manual measuring station
OP-10 identifying of parts
OP-15 mass-centering-measuring of imbalance
11 travel of production line
OP-20 cutting to length, centering, geometrically alternatively: mass-centering
OP-30 turning
OP-40 rough-milling of main and rod bearings
12 milling machine
13 milling machine
14 turning machine
15 turning machine
16 pallet accumulator
17 separating gap
18 transfer belt
19 feed, input
20 milling machine
21 milling machine
22 turn/turn-broaching machine
OP-50 turn/turn-broaching of main bearings
OP-60 finish-milling of rod bearings
23 pallet accumulator
24 pallet accumulator
25 output
26 guide rail
27 guide rail
28 separating gap
29 pallet accumulator
30 bays
31 transfer carriages—portal robots
32 vertical
33 AFO=working sequence
34 production line
35 outer long side
36 inner long side
37 horizontal guide
38 vertical guide
39 vertical row
40 vertical row
41 lateral separating gap
48 transverse direction
49 ready position
50 vertical row

The invention claimed is:

1. A production line for machining of shaft-like workpieces in machining operations, characterized in that
the production line is subdivided into a plurality of decoupling modules,
each decoupling module is provided to feed individual workpieces deposited in a plurality of addressable pallets to at least one of a plurality of similar or different machining operations,
individual decoupling modules are combined with one another both in and counter to the direction of the production line, at the beginning of the production line, the decoupling module is connected to art infeed device for pallets containing workpieces to be machined and at the end of the production line the decoupling module is connected to a removal device for pallets containing machined workpieces;

wherein each decoupling module is provided with a pallet accumulator in which a plurality of bays, each for receiving one pallet containing workpieces, is disposed one above the other in direction of the production line;

wherein in direction of the production line a rack servicing unit is assigned to a first long side of the pallet accumulator whereas, transverse to the direction of the production line at least one transfer carriage and one machining operation are assigned to a second long side of the pallet accumulator and a transfer belt to a following decoupling module is assigned to at least one of the two ends of the pallet accumulator;

wherein the rack servicing unit is equipped with a controller, upon the command signal of which the rack control unit can be moved forward and back on at least one horizontal guide along the pallet accumulator in the direction of the production line and can also be moved up and down in vertical direction and can be positioned in front of each bay of the pallet accumulator in a manner corresponding to the respective address of a pallet, and also is provided with a device, by means of which a pallet can be removed from its bay and deposited in a bay.

2. A production line according to claim 1, characterized in that the rack servicing unit is provided to pick up individual pallets from one of the transfer conveyors and to deposit them on one of the transfer conveyors or in one of the bays of the pallet accumulator as well as to operate the infeed device and/or removal device for pallets.

3. A production line for machining of shaft-like workpieces in machining operations, characterized in that the production line is subdivided into a plurality of decoupling modules, each decoupling module is provided to feed individual workpieces deposited in a plurality of addressable pallets to at least one of a plurality of similar or different machining operations, individual decoupling modules are combined with one another both in and counter to the direction of the production line, at the beginning of the production line, the decoupling module is connected to an infeed device for pallets containing workpieces to be machined and at the end of the production line the decoupling module is connected to a removal device for pallets containing machined workpieces;

wherein each decoupling module is provided with a pallet accumulator in which a plurality of bays, each for receiving one pallet containing workpieces, is disposed one above the other in direction of to production line;

wherein in direction of the production line a rack servicing unit is assigned to a first long side of the pallet accumulator whereas, transverse to the direction of the production line at least one transfer carriage and one machining operation are assigned to a second long side of the pallet accumulator and a transfer belt to a following decoupling module is assigned to at least one of the two ends of the pallet accumulator;

wherein vertical rows of bays of the pallet accumulator are provided with a device of the type of a slide-in/slide-out table, by means of which a pallet can be brought from the bay of the row outside the second long side of the pallet accumulator into a ready position and returned from the ready position into the bay of the row.

4. A production line for machining of shaft-like workpieces in machining operations, characterized in that the production line is subdivided into a plurality of decoupling modules, each decoupling module is provided to feed individual workpieces deposited in a plurality of addressable pellets to at least one of a plurality of similar or different machining operations, individual decoupling modules are combined with one another both in and counter to the direction of the production line, at the beginning of the production line, the decoupling module is connected to an infeed device for pellets containing workpieces to be machined and at the end of the production line the decoupling module is connected to a removal device for pallets containing machined workpieces;

wherein each decoupling module is provided with a pallet accumulator in which a plurality of bays, each for receiving one pallet containing workpieces, is disposed one above the other in direction of the production line;

wherein in direction of the production line a rack servicing unit is assigned to a first long side of the pallet accumulator whereas, transverse to the direction of the production line at least one transfer carriage and one machining operation are assigned to a second long side of the pallet accumulator and a transfer belt to a following decoupling module is assigned to at least one of the two ends of the pallet accumulator, wherein characterized in that the transfer carriage is designed as a portal robot, which can be moved along horizontal and vertical guides in each of two directions.

5. A production line according to claim 3, characterized in that the horizontal guide of the transfer carriage extends from the ready position for a pallet on the pallet accumulator to each of the machining operations disposed one after the other in a transverse direction.

6. A production line according to claim 5, characterized in that the vertical guide of the transfer carriage extends from the lowest to the highest bay of a row of tile pallet accumulator.

7. A production line according to claim 5, characterized in that a lateral separating gap is present in direction flow direction of the production line between adjacent transfer carriages of a pallet accumulator.

8. The production line of claim 1, wherein a plurality of workpieces are deposited on each of the plurality of addressable pallets and each decoupling module is provided to feed individual workpieces from the plurality of workpieces to the at least one of the plurality of similar or different machining operations.

9. A production line for machining of shaft-like workpieces in machining operations, characterized in that the production line is subdivided into a plurality of decoupling modules, each decoupling module is provided to feed individual workpieces deposited in a plurality of addressable pallets to at least one of a plurality of similar or different machining operations, individual decoupling modules are combined with one another both in and counter to the direction of the production line, at the beginning of the production line, the decoupling module is connected to an infeed device for pallets containing workpieces to be machined and at the end of the production line the decoupling module is connected to a removal device for pallets containing machined workpieces;

wherein each decoupling module is provided with a pallet accumulator in which a plurality of bays, each for receiving one pallet containing workpieces, is disposed one above the other in direction of the production line;

wherein in direction of the production line a rack servicing unit is assigned to a first long side of the pallet accumulator whereas, transverse to the direction of the production line at least one transfer carriage and one machining operating are assigned to a second long side of the pallet accumulator and a transfer belt to a following decoupling module is assigned to at least one of the two ends of the pallet accumulator;

wherein opposite the pallet accumulator of one decoupling module, there is disposed a further pallet accumulator of the same or of another decoupling module, at a lateral separating gap and parallel thereto:

wherein between each two pallet accumulators, there is disposed a rack servicing unit, with which both pallet accumulators can be serviced.

10. A production line for machining of shaft-like workpieces in machining operations, characterized in that the production line is subdivided into a plurality of decoupling modules, each decoupling module is provided to feed individual workpieces deposited in a plurality of addressable pallets to at least one of a plurality of similar or different machining operations, individual decoupling modules are combined with one another both in and counter to the direction of the production line, at the beginning of the production line, the decoupling module is connected to an infeed device for pallets containing workpieces to be machined and at the end of the production line the decoupling module is connected to a removal device for pallets containing machined workpieces:

wherein each decoupling module is provided with a pallet accumulator in which a plurality of bays, each for receiving one pallet containing workpieces, is disposed one above the other in direction of the production line;

wherein in direction of the production line a rack servicing unit is assigned to a first long side of the pallet accumulator whereas, transverse to the direction of the production line at least one transfer carriage and one machining operation are assigned to a second long side of the pallet accumulator and a transfer belt to a following decoupling module is assigned to at least one of the two ends of the pallet accumulator;

wherein, for guidance of the rack servicing unit, there are provided two horizontal guides, which extend in parallel and at a vertical separating gap relative to one another in, direction of the production line along and also parallel to the pallet accumulator(s) of one or two decoupling modules.

11. A production line according to claim 10, characterized in that the upper of the two horizontal guides for a rack servicing unit extends in direction of the production line from one decoupling module to the other.

12. A production line for machining of shaft-like workpieces in machining operations, characterized in that the production line is subdivided into a plurality of decoupling modules, each decoupling module is provided to feed individual workpieces deposited in a plurality of addressable pallets to at least one of a plurality of similar or different machining operations, individual decoupling modules are combined with one another both in and counter to the direction of the production line, at the beginning of the production line, the decoupling module is connected to an infeed device for pallets containing workpieces to be machined and at the end of the production line the decoupling module is connected to a removal device for pallets containing machined workpieces;

wherein each decoupling module is provided with a pallet accumulator in which a plurality of bays, each for receiving one pallet containing workpieces, is disposed one above the other in direction of the production line;

wherein in direction of the production line a rack servicing unit is assigned to a first long side of the pallet accumulator whereas, transverse to the direction of the production line at least one transfer carriage and one machining operation are assigned to a second long side of the pallet accumulator and a transfer belt to a following decoupling module is assigned to at least one of the two ends of the pallet accumulator;

wherein opposite the pallet accumulator of one decoupling module, there is disposed a further pallet accumulator of the same or of another decoupling module, at a lateral separating gap and parallel thereto;

wherein two decoupling modules with different operations are respectively combined as a multiple decoupling module, which can be serviced by at least one rack servicing unit.

13. A production line according to claim 12, characterized in that a machining station in the form of a production cell that provides process data to the master computer is gated to a pallet accumulator.

* * * * *